C. A. RAULF.
DOVETAILING MACHINE.
APPLICATION FILED AUG. 19, 1912.
1,087,460.
Patented Feb. 17, 1914.
3 SHEETS—SHEET 1.
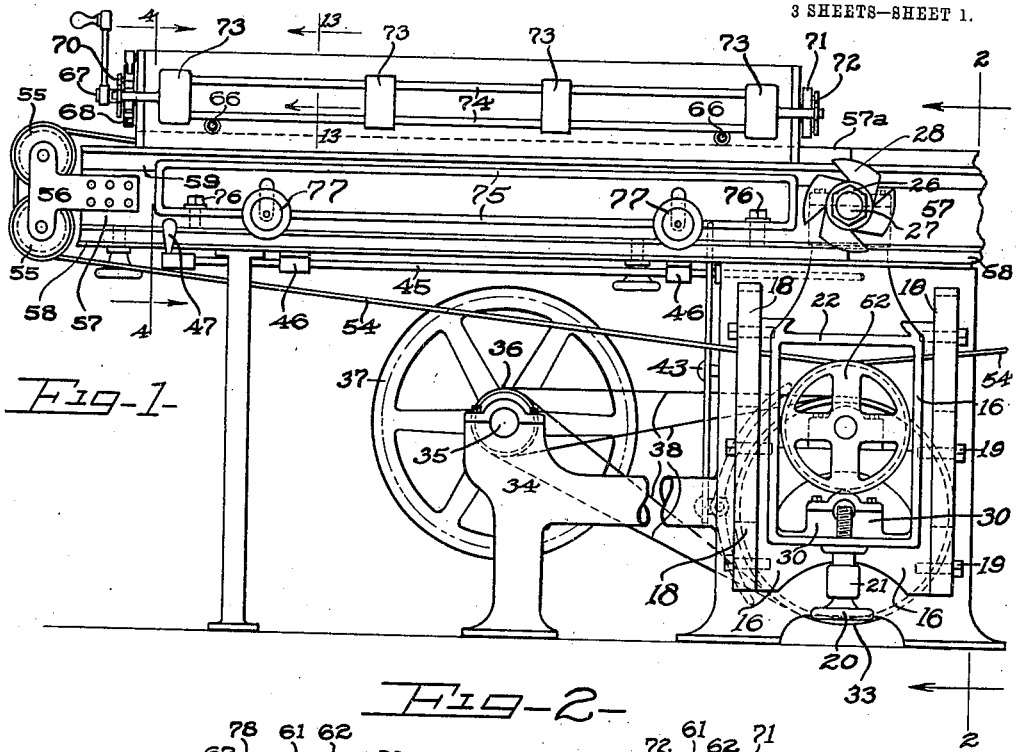
Fig-1-
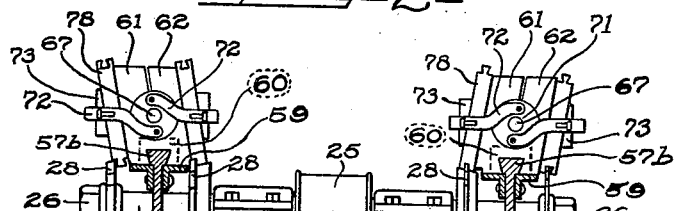
Fig-2-
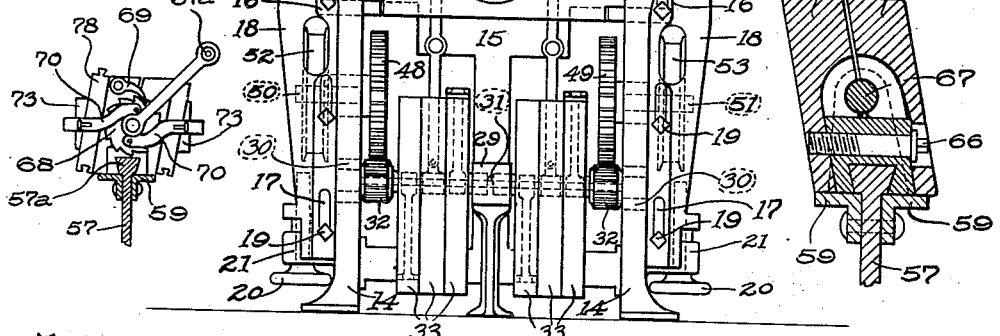
Fig-3- Fig-4-
Witnesses:
Thomas J. Morgan, Jr.
Gustave T. Fraenckel
Inventor—
Carl-A-Raulf-
By Morgan & Rubinstein
Attys

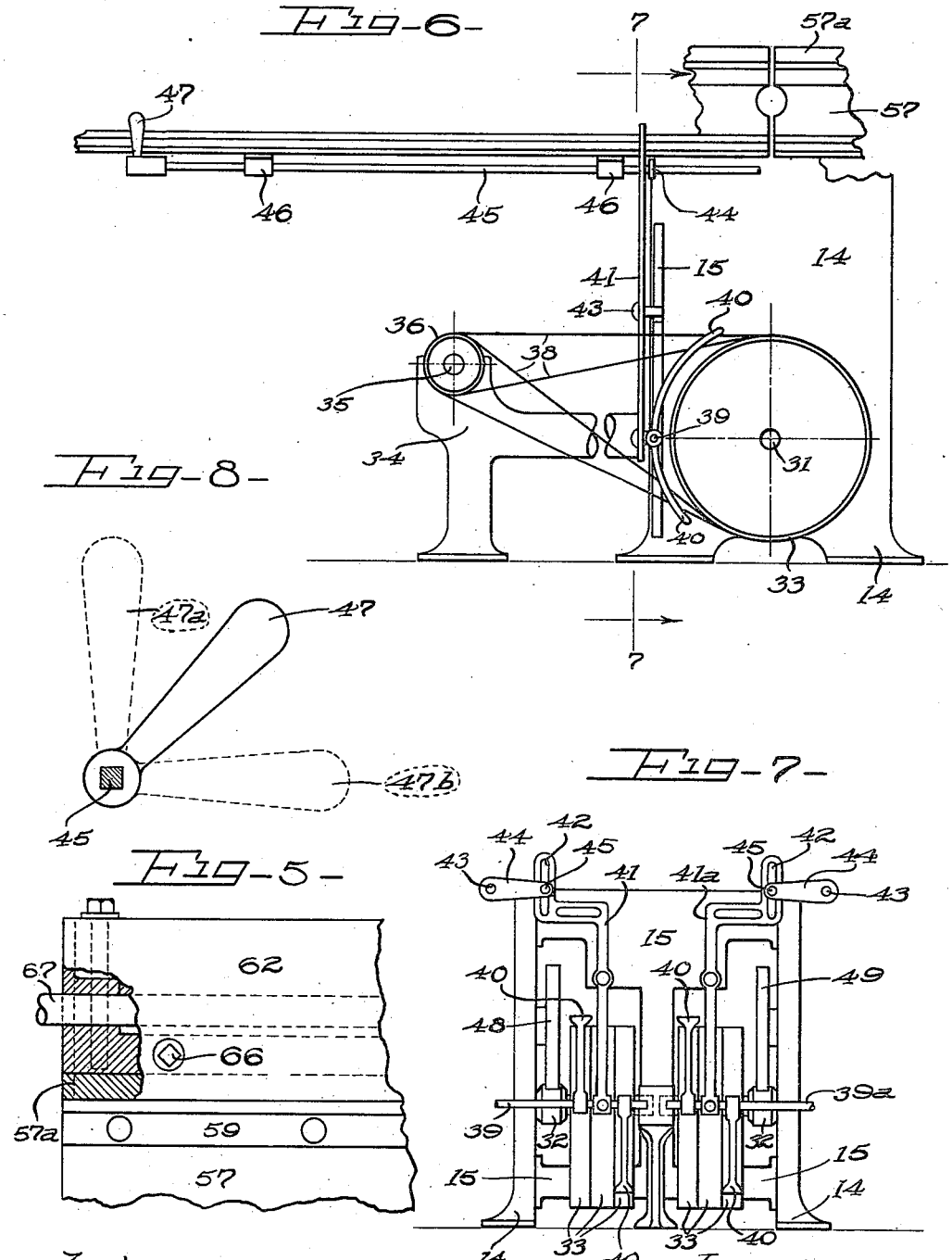

C. A. RAULF.
DOVETAILING MACHINE.
APPLICATION FILED AUG. 19, 1912.
1,087,460.
Patented Feb. 17, 1914.
3 SHEETS—SHEET 3.
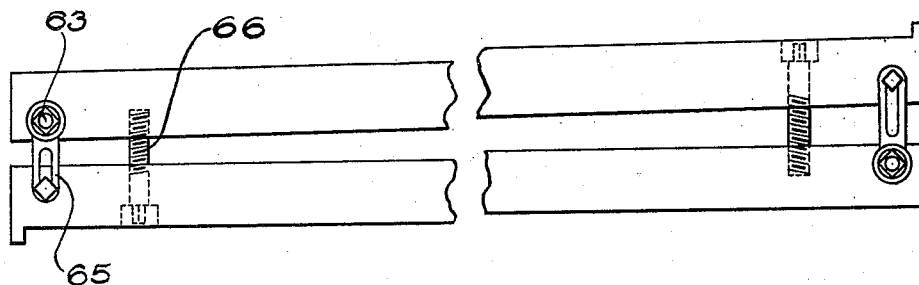
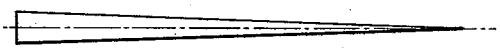
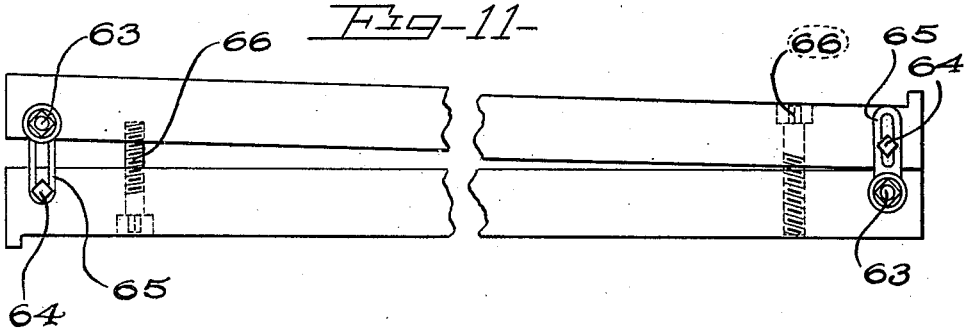
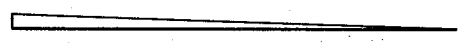
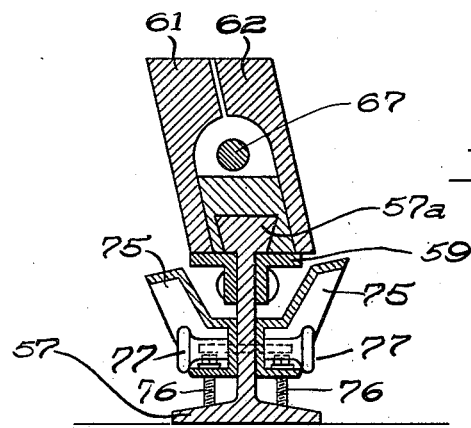
Witnesses:
Thomas J. Morgan, Jr.
Gustave P. Fraenckel
Inventor—
Carl-A-Raulf-
By Morgan & Rubinstein
Attys

UNITED STATES PATENT OFFICE.

CARL A. RAULF, OF CHICAGO, ILLINOIS, ASSIGNOR TO RAULF MANUFACTURING COMPANY, OF CHICAGO, ILLINOIS, A CORPORATION OF ILLINOIS.

DOVETAILING-MACHINE.

1,087,460.   Specification of Letters Patent.   Patented Feb. 17, 1914.

Application filed August 19, 1912. Serial No. 715,910.

*To all whom it may concern:*

Be it known that I, CARL A. RAULF, a citizen of the United States, residing at Chicago, in the county of Cook and State of Illinois, have invented a new and useful Improvement in Dovetailing-Machines, of which the following is a specification.

The object of my invention is to produce a simple, cheap and effective machine operable by one person, by which not only the ordinary dovetail tongue and groove can be made, but that can be adjusted to make a gradual tapering dovetail tongue and groove whereby the matched parts can be wedged together; a machine which can be adjusted to make various degrees of taper in any sized dovetail tongue and groove.

The manner in which I accomplish my object is described in the following specification and illustrated in the accompanying drawings in which:—

Figure 1 is a side elevation. The right end of part of the frame being broken away. Fig. 2, is an end elevation on the line 2—2 Fig. 1, the parts broken away in Fig. 1 being in section. Fig. 3 is a left end elevation of one end of the traveling carriage and part of the frame being in section. Fig. 4 is a vertical sectional elevation on the line 4—4 Fig. 1. Fig. 5, is a fragmental sectional side elevation of parts shown in Fig. 4. Fig. 6 is a side elevation of part of the driving and the belt shifting mechanism. Fig. 7, is a vertical sectional elevation on the line 7—7 Fig. 6. Fig. 8 is an end elevation of one of the belt shifting handles, the rod being in section and the dotted lines indicating the relative operative positions. Fig. 9 is a top plan of the carriage adjusted for a tapering wedge shaped dovetail tongue or groove. Fig. 10 indicates the wedge shape of the tongue, that is cut when the carriage is set as shown in Fig. 9. Fig. 11, is a top plan of the parts shown in Fig. 9, adjusted for a one sided wedge shape, shown in Fig. 12. Fig. 13 is a section on the line 13—13 Fig. 1.

In the drawings 14 indicates the main frames which are shown in side elevation in Fig. 1, and in end elevation in Fig. 2. These frames are joined by a plate 15 shown in Figs. 2, 6, and 7. Forming part of the frames are vertical parallel walls 16. Extending through these walls are vertical slots 17. Movable vertically between the walls 16, on the side of each of the frames 14 is a frame 18 which is adjustably secured by screw bolts 19, which extend through the slots 17. The vertical movement of each of the frames 18, is made by hand screws 20, which are rotatably supported in bearings 21 forming part of the frames 14. In the top of each of the frames 18, are transverse channels 22, the walls of these channels are undercut. Supported in these channels are shaft bearings 23, which also form a transverse brace between the frames 14. Rotatably supported in the bearings 23, is a cutter spindle 24, which is provided with a central pulley 25. Both ends of this spindle are threaded, and provided with nuts 26, and sleeves 27 by which the cutters 28 are secured in position on the spindle. Centrally located between the side frames 14, is a bearing standard 29. Rotatably supported in this bearing 29, and in the bearings 30 in the frames 14, are shafts 31. Fixed on these shafts are gears 32. On each of these shafts are three pulley wheels 33, the center pulley wheel being fixed, and the outside pulleys are loose. Rotatably supported in bearings 34 secured on a rear extension of the frames 14, is a driving shaft 35. On this shaft is a drum 36, and a driving wheel 37. Connecting the drum 36 and the pulleys 33 are four belts 38. Two of these belts are straight, and two are crossed as shown in Figs. 1 and 7. Pivotally and slidably supported on the cross frame 15 are belt shifting rods 39 and 39ª. Fixed on these rods are belt shifting forks 40 in position to engage the belts 38. Pivotally connected to these rods 39 and 39ª, and to the cross plate 15 are two levers 41, and 41ª, by which the rods 39 and 39ª are operated. In the upper end of each of these levers is a vertical slot 42. Slidably engaged in these slots are crank pins 43 fixed in a crank 44. Each is fixed on a rod 45. These rods are supported in bearings 46 and operated by the handles 47 by which means the belts are shifted from the loose to the tight pulleys, and the shafts 31 and gears 32 are thereby rotated, and reversed.

In mesh with the gears 32 are gears 48 and 49. These gears are fixed on the shafts 50 and 51. On these shafts are grooved wheels 52 and 53. Coiled around the wheels 52 and 53 are cables 54. These cables pass over grooved wheels 55 which are rotatably supported in brackets 56 secured on each end of the machine. These brackets are fixed on the ends of parallel I beams 57, which are slidably secured in channel bars 58 which are supported on the frames 14. These I beams are in two parts, the ends butting together at the point indicated by 57ª shown in Figs. 1 and 6. Fixed on each side of each I beam close under the top head 57ᵇ are angle bars 59. Slidably supported on the head 57ᵇ of each I beam, and on the angle bars 59, is a block 60. Secured on this block is a carriage consisting of two main members 61 and 62. These parts are adjustably connected together by the screws 63 and 64, links 65, and screws 66. Rotatably supported in bearing projections of the block 60 indicated by dotted lines in Fig. 4 is a shaft 67. On one end of this shaft is a ratchet wheel 68, this ratchet is engaged by a pawl 69 which is secured to the end of that side of the carriage indicated by 62. Pivotally secured to the face of this ratchet wheel 68 are two links 70. Fixed on the opposite end of each of the shafts 67 is a disk 71. Pivotally secured on these disks are links 72. Adjustably attached to the links are clamps 73. These clamps are connected by rods 74. Adjustably secured on each side of the I beam 57 at the left half are gage plates 75. These plates are adjustable vertically by screws 76, and secured to the I beam by the hand screws 77 which extend through the I beam. These gage plates are adapted to support the material 78 on the carriages while they are being secured by the clamps 73 as hereinafter explained.

When the several parts of the machine are constructed as described and illustrated and assembled together, their use and operation is as follows: Motive power from any suitable source being applied by transmission to the spindle pulley 25 and to the driving pulley 37; the belts 38 being held on the loose outside pulleys 33 by the belt shifting mechanism the handles 47 being then in the intermediate position shown by the solid lines 47 and the levers 41 and 41ª in the positions shown in Figs. 2 and 7. The carriages are then adjusted by the screws 64, links 65, and screws 66, as illustrated in Figs. 9 and 11 to produce the taper cut desired on the material. The handles 67ª are then placed in the position shown by the dotted lines in Fig. 3. The material 78 is then placed between the sides of the carriages and the clamps 73, the bottom edges resting on the gage plates 75. These plates are then adjusted so that the depth may be, as desired. The handles 67ª are then turned to the right to the position shown by solid lines in Figs. 1 and 3 whereby the shafts 67, ratchets 68, disks 71, links 70 and 72 are actuated and the clamps 73 drawn against the material, and the material thereby pressed against the carriages and locked by the pawl 69. One of the handles 47 is then turned to the position shown by the dotted lines 47ª in Fig. 8 and one of the belts 38 thereby shifted on to the tight pulley, whereby the gears 32, 48, wheel 52 and cable 54 are actuated; the carriage and material thereby drawn over the cutters 28; and one side of each piece of material is cut. The movement of the handle 47 to the position shown by the dotted lines 47ᵇ in Fig. 8, shifts the belts and the reverse movement of the gears, pulley, and cable moves the carriage back to the first position where the handle 47 is moved back to the position 47 and the belts thereby run on to the loose pulleys. During the travel of the first carriage, material is placed on the other carriage and is clamped and the carriage started as before explained, while the first carriage is going and returning. While the second carriage is traveling the material on the first carriage is reversed clamped and the carriage is again started while the second carriage is returning. The shifting of the belts can be either performed by the hand of the operator or by dogs which can be adjusted on the machine to move the shifters as desired. To place the cutters on or to remove them from the spindle the I beams are drawn apart, and then readjusted.

In Figs. 9 and 11 the longitudinal sections of the carriage are shown in spaced relation to each other, and the outer edges of the carriage are shown out of parallel relation to each other. This arrangement causes the carriage to cross the cutters and arbor at right angles, and the material to be cut to cross the cutters obliquely.

What I claim is:—

1. In combination, a cutter, a track for guiding work to the cutter, and a carriage having its sides inclined from a vertical plane for supporting work on the track and having its sides disposed out of parallelism with each other longitudinally of the track, and means for holding the work to the inclined sides of the carriage.

2. In combination, a cutter, a track for guiding work to the cutter, and a work supporting carriage having its sides inclined from a vertical plane and movable on the track and comprising longitudinal sections relatively adjustable laterally toward and from each other longitudinally of the track, and means for holding the work to the inclined sides of the carriage.

3. In combination, a cutter, a track for guiding work to the cutter, a carriage having its sides inclined from a vertical plane and movable on the track and having means for supporting work and comprising longitudinal sections, and means for varying the relation of the sections to each other to dispose the outer sides of the carriage out of parallelism with each other longitudinally of the track, and means for holding the work to the inclined sides of the carriage.

4. In a machine of the kind described, the combination with a main frame, a traveling carriage supported thereon having separate oblique sides, means for adjusting said sides toward and away from each other, and means for clamping and locking material on said sides to be tongued and grooved; of means adjustably supported on said frame for regulating the vertical position of material placed on said sides whereby the depth of the tongues and grooves to be cut therein can be determined as described.

5. In a machine of the kind described, the combination with a main frame; of a plurality of traveling carriages supported thereon and movable in parallel lines, each of said carriages having separate oblique sides for holding material to be tongued and grooved, means for adjusting the sides of each carriage in relation to each other and to the line of travel of the carriage, means for clamping and locking material on said sides of each of said carriages, and means for adjusting the vertical position of said material on said sides as described.

CARL A. RAULF.

Witnesses:
THOMAS J. MORGAN,
GUSTAVE T. FRAENCKEL.

---

Copies of this patent may be obtained for five cents each, by addressing the "Commissioner of Patents, Washington, D. C."